UNITED STATES PATENT OFFICE.

WILHELM WOLLENWEBER, OF BOCHUM, GERMANY.

MANUFACTURE OF ACID AMMONIUM PHOSPHATE.

1,208,877.  Specification of Letters Patent.  Patented Dec. 19, 1916.

No Drawing.  Application filed October 19, 1915. Serial No. 56,802.

*To all whom it may concern:*

Be it known that I, WILHELM WOLLENWEBER, a subject of the Emperor of Germany, residing at Bochum, Westphalia, Germany Empire, have invented certain new and useful Improvements in the Manufacture of Acid Ammonium Phosphate; and I do hereby declare the following to be a full, clear, and exact description of the invention, such as will enable others skilled in the art to which it appertains to make and use the same.

This invention relates to a process for the manufacture of acid ammonium-phosphate.

The manufacture of acid ammonium-phosphate meets with great difficulties when technically worked. On the one hand it is not easy to recognize the end of the reaction and to prevent the absorption of greater quantities of ammonia beyond the formula $(NH_4)H_2PO_4$, which produces unstable combinations. On the other hand it is expensive and gives much trouble to remove the adhering water. These faults are avoided in the present invention by conveying ammonia-vapor into phosphoric acid until the solution shows a weak alkaline reaction. For this purpose, impure gases containing ammonia, as coke-furnace-gas, Mond-gas, and even synthetic ammonia may be used. The process can be accomplished periodically or continuously.

The treatment is most successful in open or closed saturation-boxes, out of which the salt that has formed is sucked out when the working is done continuously.

In order to counteract the great heat that arises during the reaction, which heat delays the quick separation of the solid salt, it is practical to cool down the solution during reaction.

The mother-liquor is removed from the salt mass by suction or by centrifugalization. It is then mixed with a strong phosphoric acid and returned into the cycle of operations.

If phosphoric acid of a definite concentration is used, one obtains with this process, directly solid salt capable of being shipped without further treatment, which means the saving of the cost of evaporation. The most favorable working conditions are obtained by using phosphoric acid of 30° Bé., that is brought up to 32° Bé., by supplying ammonia to it.

A greater yield is quickly attained if the acid that is to be treated is first warmed, and if without exceeding a certain reaction temperature, all efforts are directed toward obtaining a density as high as possible. The most appropriate temperature of reaction is 110° C. This process is carried out in detail as follows: The phosphoric acid, the concentration of which is about 30° Bé., is first heated up to 80–90° C., for instance by a suitable heating coil. The acid is subjected to the action of the ammonia until the mass has a density of 37–38° Bé., the temperature being kept at 110° C. To do this under all conditions, it may be necessary to cool during the course of the reaction. The end of the reaction is always indicated by a slight alkaline reaction. After this, the contents of the reaction chamber are removed, the mass is cooled, for instance by means of an air current, and finally subjected to centrifugalization. The mother-liquor is returned to the reaction chamber and used for further reactions.

I claim—

1. In the process for the manufacture of acid ammonium-phosphate, the step which comprises conveying ammonia into phosphoric acid until a weak alkaline reaction results, and maintaining the reaction temperature at about 110° C.

2. In the process for the manufacture of acid ammonium-phosphate, the step which comprises conducting ammonia into phosphoric acid of 30° Bé., until a minimum 32° Bé., are reached.

3. The process for the manufacture of acid ammonium-phosphate which comprises warming 30° Bé., phosphoric acid to 80°–90° C., conducting ammonia into the same until the solution has a concentration of 37°–38° Bé., and maintaining the reaction temperature at about 110° C.

4. The process for the manufacture of acid ammonium-phosphate, which comprises warming 30° Bé., phosphoric-acid to 80°–90° C., subjecting the acid to the action of the ammonia until the solution has a concentration of 37°–38° Bé., and is slightly alkaline, maintaining the reaction temperature at about 110° C., separating the salt-mass from the mother-liquor, mixing the separated liquor with a strong phosphoric acid and returning the mixture into the cycle of operations.

In testimony that I claim the foregoing as my invention, I have signed my name in presence of two subscribing witnesses.

WILHELM WOLLENWEBER. [L. S.]

Witnesses:
 ALBERT NUFER,
 FRANCES NUFER.